Patented June 26, 1934

1,964,683

UNITED STATES PATENT OFFICE 1,964,683

PIGMENT

Joseph W. Ayers, Easton, Pa., assignor to C. K. Williams & Company, Easton, Pa., a corporation of Pennsylvania No Drawing. Application July 12, 1932, Serial No. 622,112

9 Claims. (Cl. 134—59)

The present invention relates to ferric oxide, calcined from sulphates, for use as a pigment.

It has been discovered by the present inventor that in the manufacture of rubber goods, oil compositions and clay dispersions in which ferric oxide, calcined from sulphates or precipitated from solutions of an iron salt such as sulphates or chlorides of iron, is used as a pigment, that the pigment fades and discolors under the action of light and under the action of the atmosphere, that vulcanization of the rubber is retarded, that articles compounded with this pigment age poorly, the presence of the pigment apparently accelerating aging of the rubber, that oil compositions dry erratically and that the pigment causes flocculation of clay in clay dispersions. Ferric oxide is a brilliant red and in other respects is an excellent pigment for use in rubber compounding, oil compositions such as paints, linoleums and clay dispersions. The present invention seeks to improve this pigment and to remove the above-mentioned disadvantages and defects.

The undesirable effects of ferric oxide have been traced by the present inventor to the presence of minute quantities of impurities, such as ferric sulphate and other compounds occluded to the ferric oxides, and it has been found that by treating the pigment to remove these traces, the undesirable properties of such ferric oxide are overcome. Moreover, the dispersion of the pigments in rubber compounds is improved as also is its wettability and ease of grinding in oil compositions.

In the ordinary methods of manufacturing this ferric oxide, after the roasting of the ferrous sulphate or the precipitation of the ferric oxide from ferrous or ferric iron sulphates or chlorides with basic precipitating agents, the raw product is decanted in repeated washings until practically all of the impurities are removed. This requires from six to sixteen or more decanting operations with water and steam, whereupon the pigment is filtered, ground and ready for the market.

The material thus prepared has been considered sufficiently pure for commercial purposes, but the deleterious effects heretofore accompanying the use of these pigments has been traced by the present inventor to traces of impurities in this pigment.

By the process embodying the invention herein, the product, after careful and exacting decantation as above described, is treated with a basic material such as an alkaline salt which has no effect upon the ferric oxide, but which converts the traces of impurities to materials which are neutral and inert with respect to the compounded rubber. The soluble materials resulting from the reaction are washed out of the ferric oxide and the resultant product will be found to be entirely free of all traces of the objectionable materials. Any traces of soluble sulphates does not injuriously affect the resultant pigment.

For the purpose of illustrating one method of carrying out the invention, the following detailed description is given, it being understood that the invention is not limited to the exact details in materials or steps.

The ferric oxide is treated after the decanting operations with sodium carbonate ($Na_2CO_3$). This is preferably done by spraying the filter cake of ferric oxide with a solution of sodium carbonate. It may also be done by treating the ferric oxide with the sodium carbonate solution which may be brought to a boil preferably at atmospheric pressure or by merely allowing the ferric oxide to age in the sodium carbonate solution, say twelve hours.

The process described is particularly valuable as the color of the ferric oxide is not injuriously affected and the ferric oxide will retain its desirable brightness. Were the ferric oxide to be treated without first removing as much of the impurities as possible before the treatment with the basic reagent, the resultant product would discolor due to the formation of substantial amounts of precipitates of iron compounds in the mass.

The process, therefore, contemplates the treatment of ferric oxide with a suitable basic material after the removal of all of the impurities such as ferric sulphate which it is possible to remove practically by the usual decanting processes. Instead of sodium carbonate, the other alkaline and alkaline-earth hydroxides or carbonates may be employed. It is understood that the term "alkaline" as used in the appended claims is used in its wider sense as denoting basic materials of substantial strength and not only strictly alkaline materials but also the alkaline-earth materials have the required basicity.

As outlined above, the resultant pigment is entirely free of all traces of deleterious substances and vulcanized rubber, paints, linoleums, clay dispersions, etc., compounded with the treated oxide will have vastly superior qualities. The time required for vulcanization of rubber compounded with the treated oxide is greatly reduced. These results are accomplished without sacrificing any of the valuable coloring properties of the ferric oxide. By the use of the basic material in slight excess the final product is slightly basic, which aids in the vulcanization and gives the pigment a hydrogen ion value above 7.

This is a continuation-in-part of application Serial No. 549,575, filed July 8, 1931.

This application has also been amended to include the subject matter of companion application Serial Number 622,111, filed of even date herewith.

Modifications of the invention may be resorted to without departing from the spirit thereof or the scope of the appended claims.

What is claimed is:—

1. Pigment particles comprising ferric oxide produced by treatment of an iron salt and freed from all but traces of water soluble constituents by a thorough washing and containing traces only of compounds adhering to the surfaces of the particles, which compounds are the result of the reaction of an alkaline material with said traces of the water soluble constituents occluded on the surfaces of the particles after said washing, said particles being capable of effective dispersion in compositions such as rubber, paint, linoleum, clay dispersions or the like, and being highly resistant to fading under the action of light.

2. Pigment particles as set forth in claim 1, said alkaline material being present in excess on the particles.

3. Pigment particles as set forth in claim 1, said alkaline material comprising sodium carbonate.

4. Pigment particles comprising ferric oxide produced by calcination of ferric sulphate and freed from all but traces of water soluble constituents by a thorough washing and containing traces only of compounds adhering to the surfaces of the particles, which compounds are the result of the reaction of an alkaline material with said traces of the water soluble constituents occluded on the surfaces of the particles after said washing, said particles being capable of effective dispersion in compositions such as rubber, paint, linoleum, clay dipersions or the like, and being highly resistant to fading under the action of light.

5. Pigment particles as set forth in claim 4, said alkaline material being present in excess on the particles.

6. Pigment particles as set forth in claim 4, said alkaline material comprising sodium carbonate.

7. Pigment particles comprising ferric oxide produced by precipitation from a solution of an iron salt and freed from all but traces of water soluble constituents by a thorough washing and containing traces only of compounds adhering to the surfaces of the particles, which compounds are the result of the reaction of an alkaline material with said traces of the water soluble constituents occluded on the surfaces of the particles after said washing, said particles being capable of effective dispersion in compositions such as rubber, paint, linoleum, clay dispersions or the like, and being highly resistant to fading under the action of light.

8. Pigment particles as set forth in claim 7, said alkaline material being present in excess on the particles.

9. Pigment particles as set forth in claim 7, said alkaline material comprising sodium carbonate.

JOSEPH W. AYERS.